United States Patent [19]

Mills

[11] Patent Number: 5,615,247
[45] Date of Patent: Mar. 25, 1997

[54] SECURITY DEVICE FOR THE PROTECTION OF CARGO TRANSPORT CONTAINERS

[76] Inventor: Thomas O. Mills, 1202 San Augustine Ct., Southlake, Tex. 76092

[21] Appl. No.: 321,327

[22] Filed: Oct. 11, 1994

[51] Int. Cl.[6] .......................... H04Q 7/20; H04M 11/04; G08B 13/00
[52] U.S. Cl. ..................... 379/58; 379/44; 340/541
[58] Field of Search ............................ 379/58, 59, 56, 379/63, 60, 44; 235/385, 383, 384; 455/33.1, 54.1; 340/539, 540, 541; 342/457

[56] References Cited

U.S. PATENT DOCUMENTS

| | | | |
|---|---|---|---|
| 3,732,555 | 5/1973 | Strenglein | 340/258 B |
| 3,925,763 | 12/1975 | Wadhwani et al. | 340/164 R |
| 3,961,323 | 6/1976 | Hartkorn | 340/280 |
| 4,001,772 | 1/1977 | Powell et al. | 340/171 |
| 4,352,097 | 9/1982 | Hamann | 340/571 |
| 4,412,292 | 10/1983 | Sedam et al. | 364/479 |
| 4,613,848 | 9/1986 | Watkins | 340/541 |
| 4,651,157 | 3/1987 | Gray et al. | 342/457 |
| 4,688,244 | 8/1987 | Hannon et al. | 379/58 |
| 4,694,282 | 9/1987 | Tamura et al. | 340/539 |
| 4,694,284 | 9/1987 | Leveille et al. | 340/574 |
| 4,750,197 | 6/1988 | Denekamp et al. | 379/58 |
| 4,952,908 | 8/1990 | Sanner | 340/52 |
| 5,025,253 | 6/1991 | DiLullo et al. | 340/825.06 |
| 5,081,667 | 1/1992 | Drori et al. | 379/59 |
| 5,131,019 | 7/1992 | Sheffer et al. | 379/39 |
| 5,164,979 | 11/1992 | Choi | 379/40 |
| 5,200,735 | 4/1993 | Hines | 340/539 |

*Primary Examiner*—Dwayne D. Bost
*Assistant Examiner*—Michael B. Chernoff
*Attorney, Agent, or Firm*—Laura J. Zeman

[57] ABSTRACT

A security device for the protection of cargo transport containers for use in the cargo transport industry. Once activated, the device notifies a security company that a break-in has taken place through the use of a cellular phone network. The security device utilizes a pair of cables exposed to the outside of the cargo transport container. In use, the cables are threaded through the door handles of the cargo transport container. Once the cables are joined on the outside of the cargo transport container, the device is armed. The security device becomes secure once a security code is entered by a user. Once the security code is entered and the cables are connected, the cargo doors may not be opened unless done by an authorized person. Should the pair of cables become disconnected or cut during transport of the container, the device will transmit a high frequency signal to a security company via a cellular telephone network. The cables contain lights embedded within them that blink in a rotating fashion when the device is armed to inform the user that the alarm is ready for use. The device is disarmed through the transmission of data from a remote location, thereby disarming the device via the cellular network after proper authorization has been received.

16 Claims, 4 Drawing Sheets

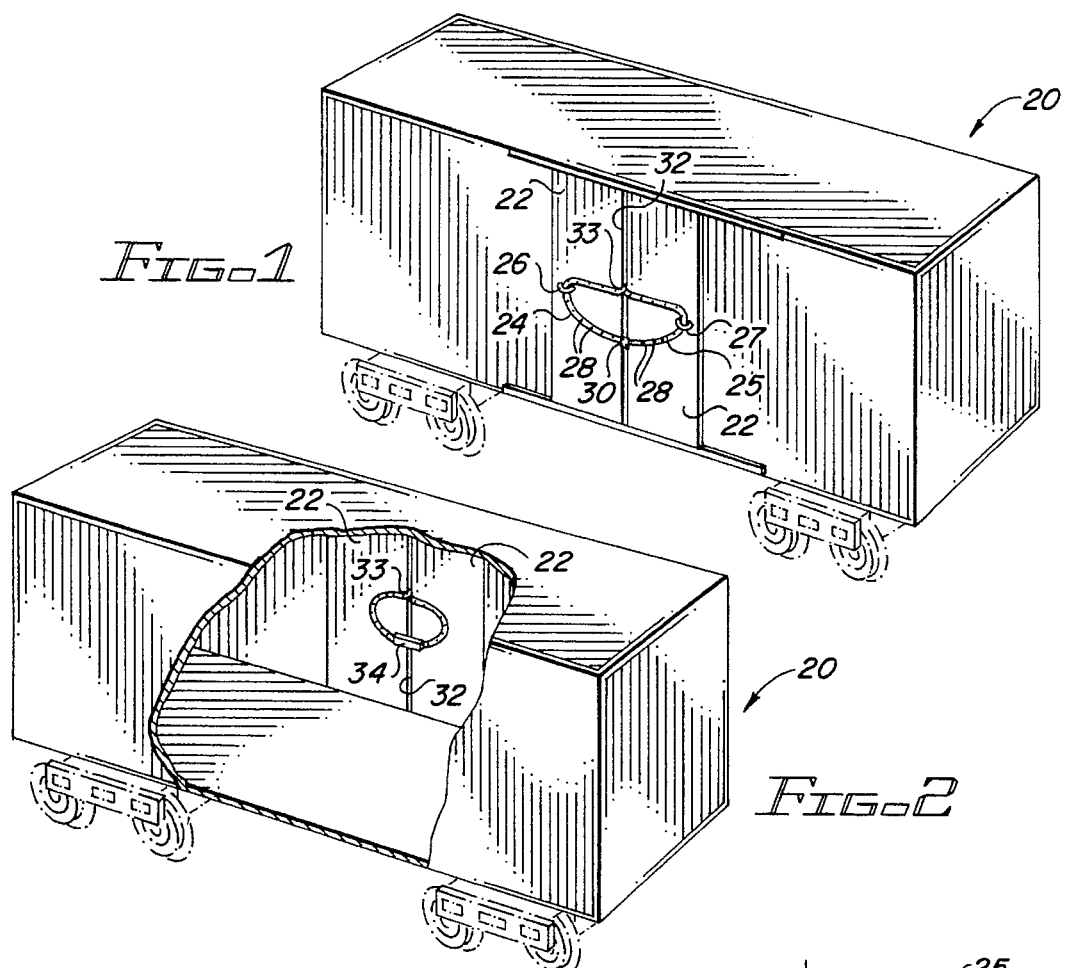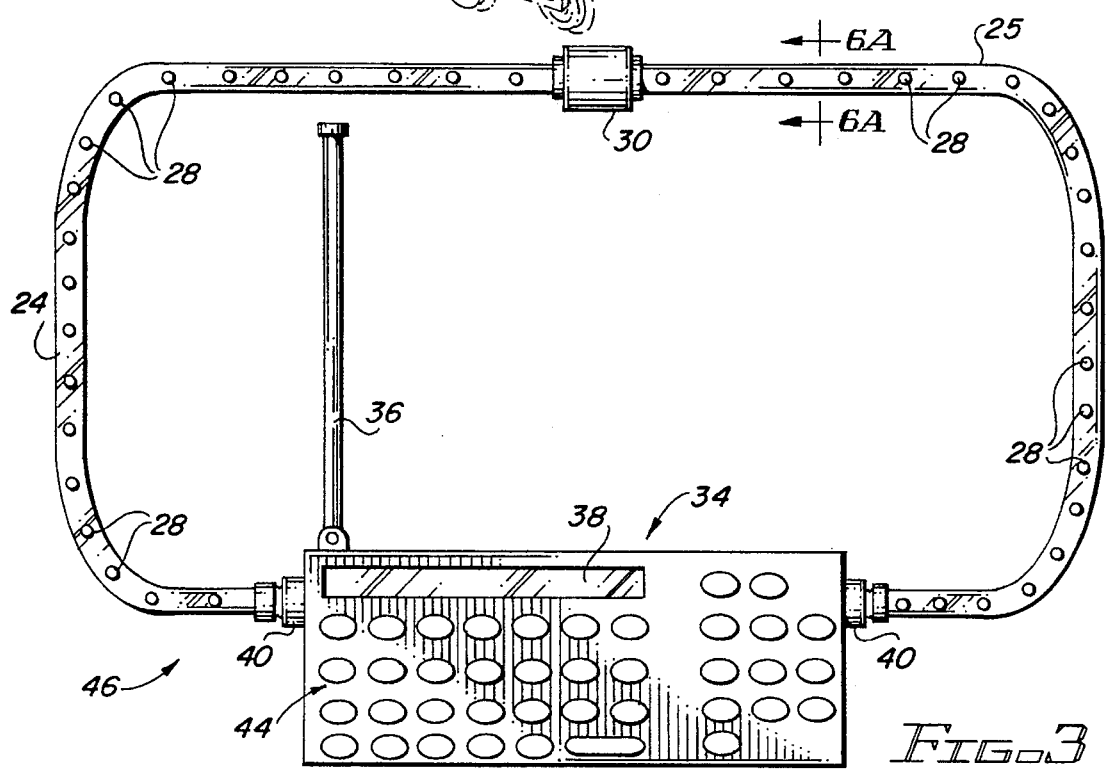

SECURITY DEVICE FOR THE PROTECTION OF CARGO TRANSPORT CONTAINERS

BACKGROUND OF THE INVENTION

The present invention relates to a security device which protects the shipment of containers in the cargo transport industry. The general concept of a security system for monitoring the unauthorized tampering or opening of containers utilized in the cargo transport business is not unique. The prior art, however, does not specifically disclose a device comprised of a circuit wire which is pulled outside the doors and through the handles of a shipment container to complete a circuit along with a means for transmitting and receiving information to a base station.

The security device of the present invention is comprised of a small cellular transmitter powered by a dry-cell battery, capable of transmitting the trailer I.D. number, a key pad that allows the user to enter the trailer I.D. number into its memory and a connector wire that has small lights located along its length that rotate once the circuit of the security device has been completed. Once the container or trailer is loaded ready for transport, the shipper programs a trailer I.D. number into the security device. After programming, the security device is placed into the interior of the truck, leaving an electrical connector wire protruding outside the doors. A series of indicator lights are embedded within the covering of the electrical connector wire. The indicator lights are easily visible to a person when viewing from close range. Once the doors are closed, the shipper connects the electrical connector wire through a rubber seal latch on the trailer doors and threaded through the door handles so that the two ends may be connected together. This will complete the security circuit and start the series of rotating lights. The rotation of the lights acts as an indicator ensuring that the circuit has been completed.

Once the seal is connected, it cannot be disconnected until a computer base station is notified and the seal is broken. The circuit seal can be re-sealed and re-programmed only by the manufacturer and/or shipper. If, while enroute, the circuit seal is broken or the trailer door is opened, the circuit is broken and thus disconnected. The cellular transmitter would then record the trailer I.D. number and call a computer station over the cellular network giving notification that the shipment container's security has been compromised.

The method of using an interlocking circuit wire that is pulled through the handles of a vehicle, prevents a would-be intruder from entering the cargo area unless he or she breaks the circuit wire connection. The rotating lights serve the purposes of not only indicating that the security device is armed, but also act as an effective deterrent to an intruder. In addition, the lights may also serve as a time-saving visual indicator to a person conducting security inspections at various checkpoints along a shipping route.

Included within today's present patent literature are various means for securing cargo loads. Disclosed in U.S. Pat. No. 4,688,244 issued to Hannon, et al. and U.S. Pat. No. 4,750,197 issued to Denekamp, et al. are the use of cellular telecommunications in transmitting security information to a base station. Lacking in the disclosures of the Hannon and Denekamp patents is the means for sealing of a cargo container through the use of a cable which is positioned through the closing mechanism of the container so as to monitor any opening or tampering of the container.

U.S. Pat. No. 5,131,019 issued to Sheffer, et al. and U.S. Pat. No. 5,164,979, issued to Choi disclose security systems which transmit monitoring information through telephone or cellular networks. Again, these patents fail to teach or suggest the use of a closed circuit sensing means which monitors the opening of the container through movement of the door, thus breaking the circuit seal, in conjunction with the transmitting of such monitoring information through the cellular network. The improvement in the present invention represents a sufficient departure from the prior art.

SUMMARY OF THE INVENTION

Accordingly, it is a broad aspect of the present invention to provide a security system for monitoring the unauthorized tampering or opening of containers utilized in the cargo transport business.

It is a further object of the present invention to provide a means for the shipper to program the trailer I.D. number into the security device.

It is a further object of the present invention to allow the transmitter to be placed into the truck, leaving the electric connector wire protruding outside the doors thus providing a means for the shipper to connect the circuit wire through the seal latches on the trailer doors, and through the door handles so that the two ends may be connected together, after the doors are closed.

It is a further object of the present invention to provide a security circuit with a series of rotating lights which can act as an indicator ensuring that the circuit has been completed.

It is another object of the present invention to prevent disconnection of the seal until at such time the computer station is notified and the seal is broken.

It is a further object of the present invention to allow the circuit seal to be re-sealed and re-programmed by the manufacturer/shipper.

It is a further object of the present invention to allow the cellular transceiver to receive information from the remote computer station while enroute, if the circuit seal is broken or the trailer door is opened.

It is a still further object of the present invention to allow the cellular transceiver to access the trailer I.D. number from memory and call a computer station giving notification that the trailer has been entered.

Further objects and advantages of this invention will appear more clearly from the following description of a non-limiting illustrative embodiment and the accompanying drawings in which like numerals designate like parts throughout the several views.

BRIEF DESCRIPTION OF THE DRAWINGS

Briefly summarized, a preferred embodiment of the invention is described in conjunction with the illustrative disclosure thereof in the accompanying drawings, in which:

FIG. 1 is a perspective view of the exterior of a cargo transport container showing the configuration of the detector cable assembly protruding from the cargo doors.

FIG. 2 is a perspective interior view of a cargo transport container showing the configuration of the control box within the said container, residing inside the cargo doors.

FIG. 3 is a top view of the control box and detector cable assembly as shown in FIGS. 1 and 2 showing all relevant elements of the present invention.

DETAILED DESCRIPTION OF THE PREFERRED EMBODIMENT

Figure 4A:
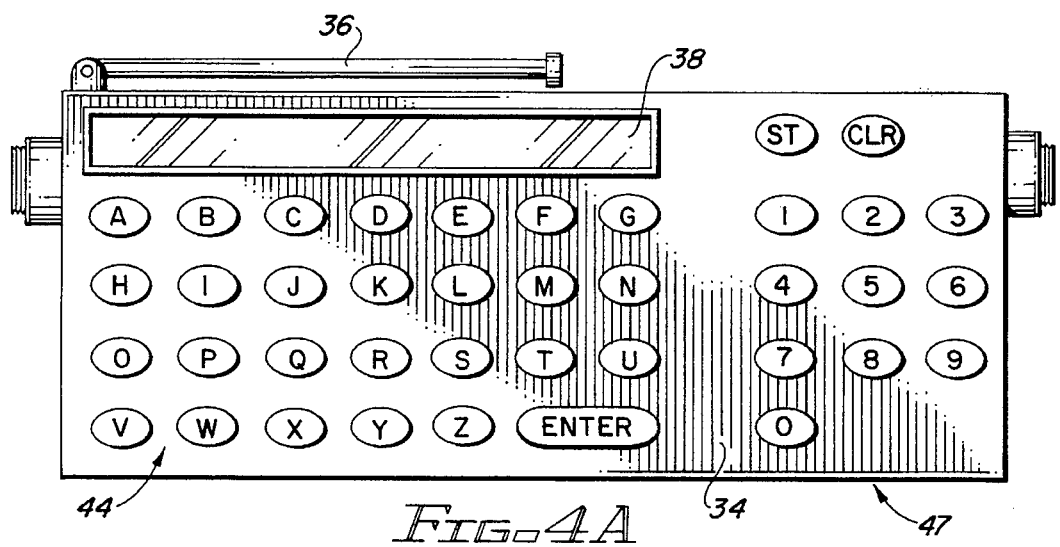
FIG. 4 is a multi-view drawing of the control module package of FIG. 3 showing the preferred embodiment of the data input device of the present invention.
Figure 4B:
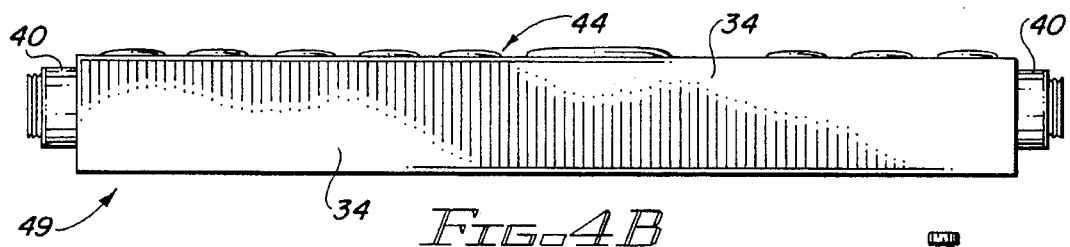
Figure 4C:
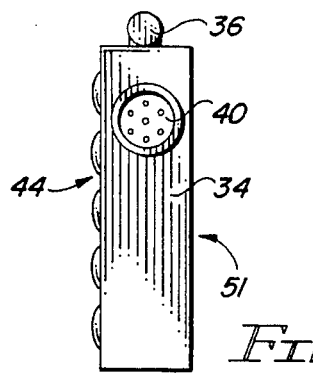
Figure 4D:
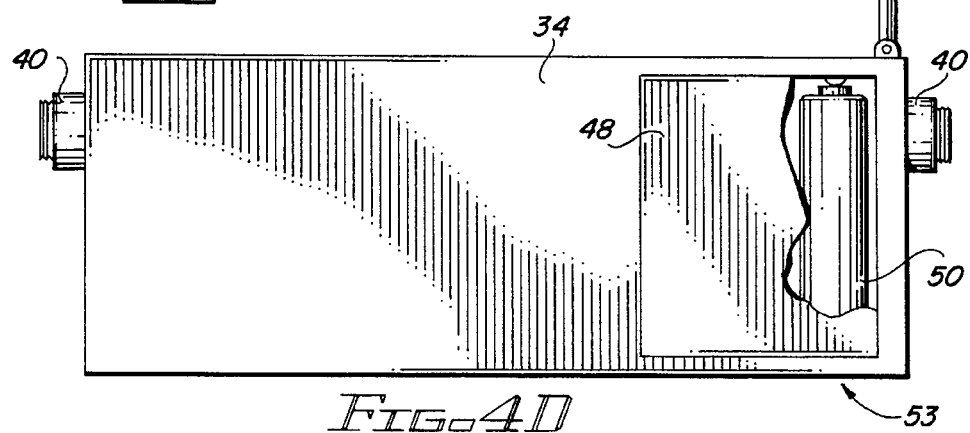

Referring particularly to the drawings, there is shown the elements of the device of the present invention. With reference to FIG. 1, an exterior view of a cargo container 20 shows how the detector cables 24 and 25, containing indicator lights 28, are connected by an electronic seal 30 when the security device 46 (see FIG. 3) is armed. The detector cables 24 and 25 protrude from the rubber seal 32 at location 33 within the cargo doors 22. The detector cables 24 and 25 are then threaded through the door handles 26 and 27 respectively where they are connected by electronic seal 30. The indicator lights 28 should be visible to a person a short distance from the cargo doors 22.

With reference to FIG. 2, an interior view of the cargo container 20 with doors 22 is shown. The detector cables 24 and 25 protrude from the rubber seal 32 at location 33 and connect to the control box 34 (see FIG. 3). Security code information is entered by a user into the control box 34 prior to the connection at the outside of the cargo container 20.

With reference to FIG. 3, the security device 46 of the present invention includes a rectangular control box 34, two cylindrical detector cables 24 and 25, a flexible cellular antenna 36, and an electronic seal connector 30.

The detector cables 24 and 25 are preferably made of rubber and are approximately 2.5 feet in length. The cables 24 and 25 are joined at one end at the electronic seal connector 30 and the opposite end at the interlocking, snap-on connectors 40. A plurality of indicator lights 28 are embedded within the cables 24 and 25. The indicator lights 28 are spaced approximately one inch apart. The indicator lights 28 are connected together so that when cables 24 and 25 are joined at the electronic seal 30 and at the connectors 40, they will blink in a sequential, rotating fashion as to indicate the armed status of the security device 46.

A flexible cellular telephone antenna 36 protrudes from the control box 34. The antenna 36 is connected to the cellular transmission circuitry 58 (refer to FIG. 4) within the control box 34. The antenna 36 is a standard cellular telephone antenna capable of transmitting and receiving high-frequency signals 78 (see FIG. 4). These high-frequency signals 78 will contain data regarding the status of the security device 46.

The exterior of control box 34 is preferably comprised of metal. The external elements of the control box 34 comprise an alphanumeric keypad 44, a LCD character display 38, and two multi-pronged cable connectors 40. The alphanumeric keypad 44 is used to enter command data that is simultaneously displayed on the LCD character display 38.

With reference to FIG. 4, a multi-view of the control box 34 depicting a top view 47, side view 49, end view 51, and a bottom view 53 are shown. Bottom view 53 shows an internal view of a battery compartment 48 and battery 50. Side view 49 shows the multi-prong connector 40 used to connect the detector cables 24 and 25 to the control box 34. Also shown are flexible antenna 36, alphanumeric LCD display 38, and alphanumeric keypad 44. The preferred embodiment of control box 34 is dimensionally approximately 12 inches in length, 4 inches in width, and 1.5 inches in height.

Figure 5:
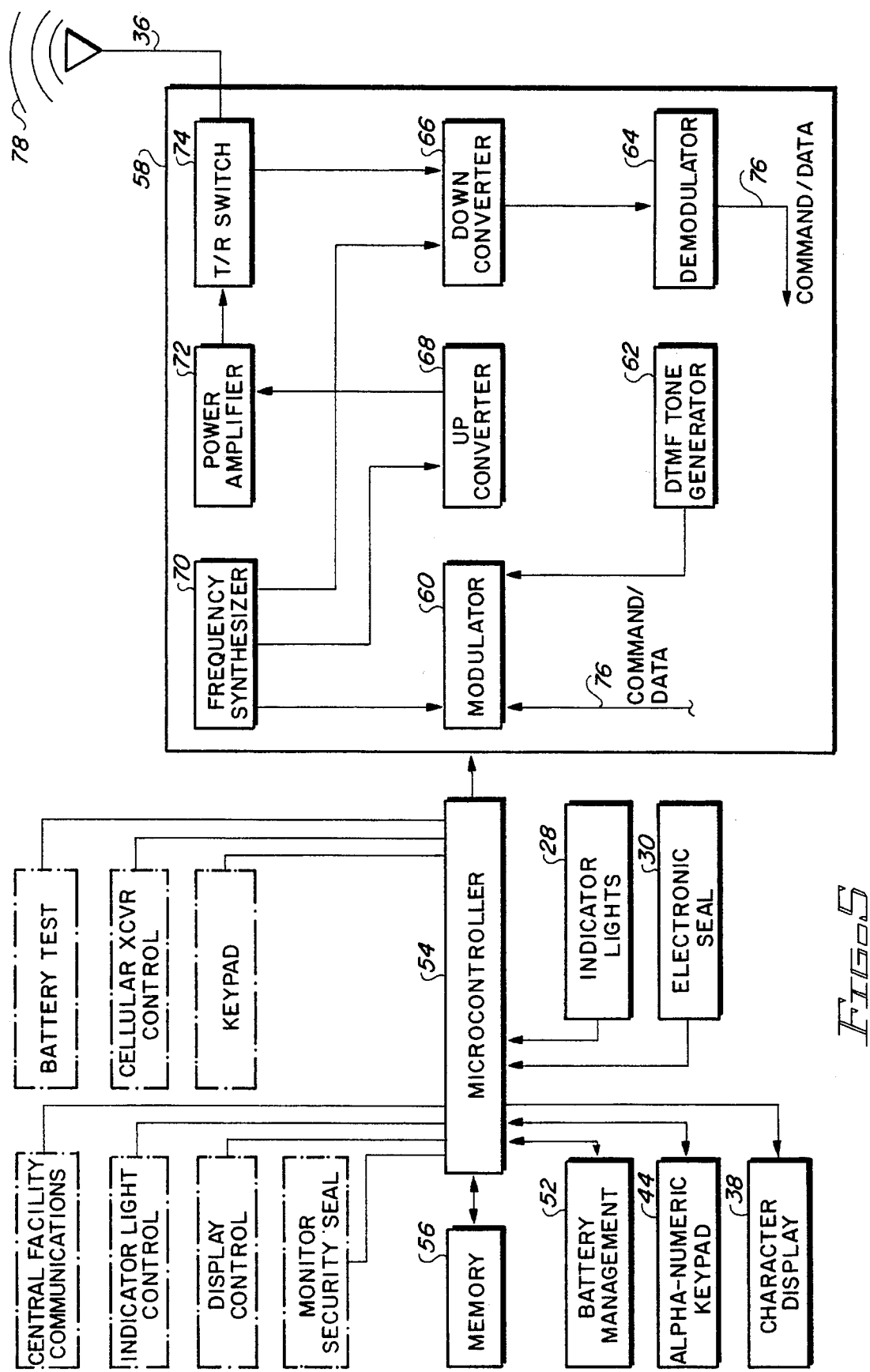
FIG. 5 is a hardware block diagram of the control module and detector cable assembly showing the functional relationship between each element of the present invention.

Referring to FIG. 5, shown is a block diagram of the control module detector cable assembly, showing the functional relationship between each element of the present invention. Shown is a microcontroller 54, connected in parallel to the following devices: battery management circuit 52, alpha-numeric keypad 44, LCD character display 38, and indicator lights 28, embedded within the detector cables 24 and 25, the electronic seal 30, a memory source 56, and the cellular telephone transmitter 58.

The battery management circuitry 52 controls the level of power consumed by the security system 46. When the system 46 is armed, the battery management circuitry 52 allows the indicator lights 28 to draw minimal current from the battery 50 (see FIG. 4), thereby increasing the life of the battery 50.

The microcontroller 54 activates the display on the LCD character display 38 when the microcontroller 54 receives inputs from the alpha-numeric keypad 44.

A connection between the detector cables 24 and 25 at the electronic seal 30 closes the circuit of the security device 46 and triggers the microcontroller 54 to begin sequentially lighting the indicator lights 28.

The cellular telephone transmitter 58 comprises a frequency synthesizer 70, a frequency modulator 60, an up-convertor 68, a dual tone multi-frequency (DTMF) tone generator 62, a power amplifier 72, the cellular antenna 36, a transmitter/receiver (TR) switch 74, a down converter 66, and a demodulator 64. Once the security device 46 is armed, should the electronic seal 30 or either detector cable 24 or 25 become detached or severed, the microcontroller 54 will activate the cellular telephone TR switch 74 to transmission mode. When the TR switch 74 is activated by the microcontroller 54, the microcontroller 54 will access command code data 76 from memory 56 so that it may be sent to the remote central facility location 90 (see FIG. 8). An initiation of a dialing sequence then begins so that the security device 46 may communicate to a remote central facility location 90 and indicate that the integrity of the device 46 has been compromised. The dialing sequence begins when the DTMF tone generator 62 delivers an audio frequency corresponding to the digits needed to contact the remote central facility location 90. The frequency modulator 60 places the audio frequency generated by the DTMF tone generator 62 and a signal corresponding to the command data 76 onto a carrier frequency generated by the frequency synthesizer 70. The frequency synthesizer 70 is then boosted by the up-converter 68 to a range in the cellular bandwidth. The energy in the high frequency signal 78 that emerges from the up-convertor 68 is boosted by the power amplifier 72 and is radiated outward as a high-frequency signal through the antenna 36. This high frequency signal 78, now contains the command data 76 and is received at the remote central location 90.

When the cargo arrives at its destination, the device 46 must be deactivated so that the user may break the electronic seal 30 and access the inside of the container 20. This is done by contacting the remote central facility location 90 and giving proper authorization (such as a password) so that the remote central facility location 90 may transmit a signal to the device 46 notifying it to disarm itself. The high frequency signal 78 from the remote central facility location 90 is received in antenna 36. When the high frequency signal 78 is received, the TR switch 74 will change to receive mode. The high frequency signal 78 is brought down from the cellular range to a lower frequency in the down-converter 66. The frequency corresponding to the command data 76 is then separated at the demodulator 64 and placed in the memory 56 for processing so that the device may be disarmed by the microcontroller 54. The potential also exists for the disarming process to be done directly via a remote cellular telephone.

Figure 6A:
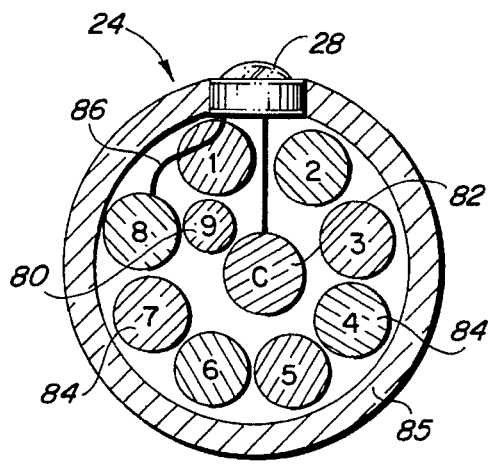
FIG. 6A is a cross-sectional view taken along line 6A—6A of FIG. 3 showing a sample wiring configuration of a single indicator light disposed within the detector cables of the present invention.

With reference to FIG. 6a, shown is a cross-sectional view of the detector cable 24 or 25 taken along line 6A—6A of FIG. 3. The cables 24 and 25 contain eight individual bus lines 84, a ground wire 82, and a security detection wire 80. All of the wires are connected directly to the microcontroller 54. The indicator lights 28 are embedded within the insulation 85 of the cables 24 and 25. A connection is made between one terminal of the light 86 and one of the bus lines from the microcontroller 84. Another connection is made between the remaining terminal of the light 86 and the ground wire 82. The security detection wire 80 serves the purpose of detecting a break in the circuit either by disconnecting the electronic seal 30, or by severing the detector cables 24 and 25, hence activating the process of notifying the remote central facility location 90.

Figure 6B:
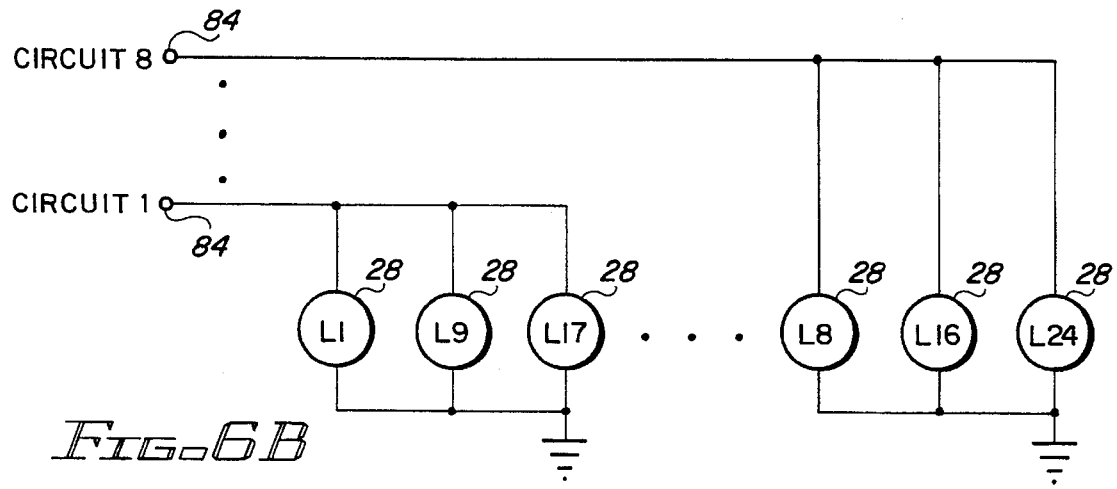
FIG. 6B is a description of the wiring configuration used to control the sequential lighting of the indicator lights.

With reference to FIG. 6b, a schematic diagram of the wiring from the microcontroller 54 to the indicator lights 28 is shown. Each of the eight bus lines 84 are connected in parallel to every eighth indicator light 28. The microcontroller 54 will strobe each bus line 84 individually with a pulse and cause three of the lights 28 along the detector cables 24 and 25 to illuminate. When this is done sequentially, the lights 28 along the detector cables 24 and 25 will appear to be moving in a sequential fashion and thereby indicating that the device 46 is secure.

Figure 7:
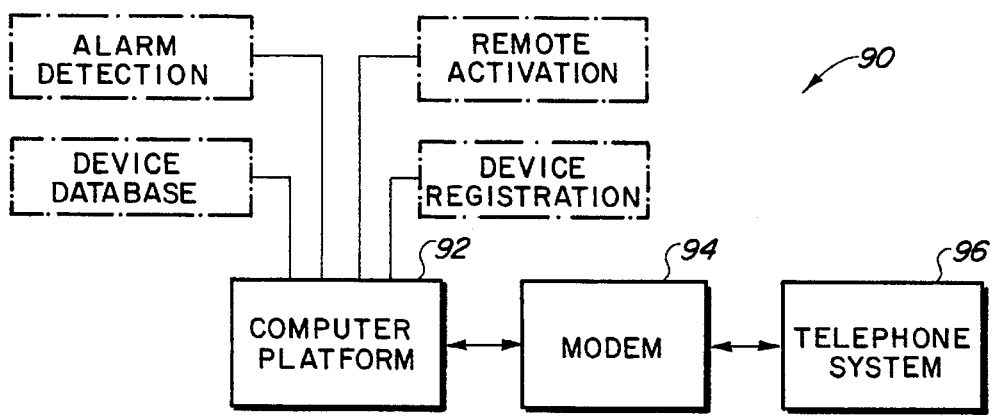
FIG. 7 is a functional block diagram of the remote central location used to transmit and receive information both to and from the security device.

With reference to FIG. 7, a functional diagram of the remote location facility 90 is shown. The facility 90 contains a computer platform 92, a modem 94, and a telephone system 96. The telephone system 96 is capable of both transmitting and receiving command data 76. When the facility receives data 76 transmitted from the security device 46 via a cellular telephone network, it is demodulated via the modem 94 and processed via the computer platform 92. Reception of the command data 76 indicates that the integrity of the device 46 has been compromised. The authorities at the remote central facility location 90 will then be notified so that measures can be taken to secure the cargo transport container 20. The remote central facility location 90 is also capable of transmitting command data 76 to the security device 46 so that it may disarm itself. This is done by having the modem 94 modulate the command data 76 from the computer platform 92 and transmit the information to the security device 46 via the telephone system 96.

It will be apparent to those skilled in the art, that the foregoing detailed description of the preferred embodiment of the present invention is representative of a type of security device for the protection of cargo transport containers while in transit, within the scope and spirit of the present invention. Further, those skilled in the art will recognize that various changes and modifications may be made without departing from the true spirit and scope of the present invention. Those skilled in the art will recognize that the invention is not limited to the specifics as shown here, but is claimed in any form or modification falling within the scope of the appended claims. For that reason, the scope of the present invention is set forth in the following claims.

What is claimed is:

1. An integrated security device for the protection of cargo containers comprising:

a mobile base module adapted for placement within an interior aspect of a cargo container;

at least one cable in electrical communication with said base module thereby creating an electronic circuit wherein at least a portion of said cable is positioned exterior to said cargo container and through an exterior closing mechanism of said cargo container there by sealing an exterior opening to the cargo container;

an input device for transmitting an alphanumeric identification code into an electronic memory of said mobile base module;

at least one power source, disposed within said mobile base module and in electrical communication with said electronic circuit;

a remote data collection facility capable of transmitting and receiving a command data created by said electronic circuit; and means for radio-telecommunications between said base module and said remote data collection facility for receipt and transmission of said common data.

2. The integrated security device of claim 1 wherein said electronic circuit further comprises:

a microcontroller interfaced with said input device and said means for radio-telecommunications;

a plurality of lights disposed within an insulative covering located within said at least one cable; and a random access memory capable of storing said identification code, connected to said microcontroller.

3. The integrated security device of claim 2, wherein said at least one cable further comprises:

a plurality of wires individually connected at one end by said plurality of lights and at the other end to said microcontroller; and a means for connecting said at least one cable, emerging from said interior aspect of said cargo container, at a location exterior said cargo transport container, whereby said cable, once connected, ensures circuit continuity and prevents access to said cargo transport container.

4. The electronic circuit of claim 2, wherein said at least one cable further comprises a means for indicating circuit continuity having said plurality of evenly spaced lights connected in parallel to said microcontroller such that said lights blink in a sequential fashion upon the condition of establishing circuit continuity.

5. The integrated security device of claim 2, wherein said input device has means for transmitting said alphanumeric identification code to said random access memory via said electronic circuit.

6. The integrated security device of claim 2, wherein said radio-telecommunications means further comprises a means for accessing a cellular telephone network upon detection of discontinuity in said electronic circuit such that said data from said random access memory may be transmitted to said remote data collection facility.

7. The integrated security device of claim 2, wherein said remote data collection facility further comprises a means for receiving said alphanumeric identification code and status of continuity for said electronic circuit, transmitted by said cellular network.

8. The integrated security device of claim 2, wherein said remote data collection facility further comprises a means for transmitting said data to said electronic circuit by said cellular network.

9. An integrated security device for the protection of cargo containers comprising:
- a mobile base module adapted for placement within an interior aspect of a cargo container;
- at least one cable in electrical communication with said base module thereby creating an electronic circuit;
- an input device for transmitting an alphanumeric identification code into an electronic memory of said mobile base module;
- a remote data collection facility capable of transmitting and receiving a command data created by said electronic circuit;
- means for radio-telecommunications between said base module and said remote data collection facility for receipt and transmission of said command data;
- a microcontroller interfaced with said input device and said means for radio-telecommunications;
- a plurality of lights disposed within an insulative covering located within said at least one cable;
- a random access memory capable of storing said identification code, connected to said microcontroller; and
- at least one power source, disposed within said mobile base module and in electrical communication with said electronic circuit.

10. The integrated security device of claim 9, wherein said at least one cable further comprises:
- a plurality of wires individually connected at one end by said plurality of lights and at the other end to said microcontroller; and
- a means for externally connecting said at least one cable emerging from said interior aspect of said cargo container, at a location exterior said cargo transport container, whereby said cable, once connected, ensures circuit continuity and prevents access to said interior aspect of said cargo container.

11. The integrated security device of claim 9, wherein said at least one cable further comprises a means for indicating circuit continuity having said plurality of evenly spaced lights connected in parallel to said microcontroller such that said lights blink in a sequential fashion upon the condition of establishing circuit continuity.

12. The integrated security device of claim 9, wherein said input device has means for transmitting said alphanumeric identification code to said random access memory via said electronic circuit.

13. The integrated security device of claim 9, wherein said radio-telecommunications means further comprises a means for accessing a cellular telephone network, upon detection of discontinuity in said electronic circuit, such that said data from said random access memory is transmitted to said remote data collection facility.

14. The integrated security device of claim 9, wherein said remote data collection facility further comprises means for receiving said alphanumeric identification code and status of continuity for said electronic circuit transmitted by said cellular telephone network.

15. The integrated security device of claim 9, wherein said remote data collection facility further comprises a means for transmitting said data to said electronic circuitry by said cellular network.

16. The method for securing cargo transport containers comprising the steps of:
- placing a mobile base module, having connected thereto, a plurality of electronic cables, within an interior aspect of a cargo transport container;
- closing a cargo transport container door, provided on said cargo transport container so as to allow for the emergence of said plurality of electronic cables to an exterior aspect of said cargo transport container;
- positioning said plurality of cables, connected to said mobile base module, through a rubber seal located on an edge of said cargo transport container door provided on said cargo transport container, and through a means for closure located on said cargo transport container doors;
- connecting said plurality of cables at their protruding ends, once positioned through said means for closure located on said cargo transport container doors, thereby creating a closed electronic circuit;
- inputting an alphanumeric identification code into an electronic memory located within said mobile base module;
- transmitting through a cellular network command data, thereby activating and deactivating said electronic circuit.

* * * * *